United States Patent Office 3,541,157
Patented Nov. 17, 1970

3,541,157
PROCESS FOR THE PREPARATION OF
SUBSTITUTED PHENYL ETHERS
Russell G. Hay, Gibsonia, and John G. McNulty and William L. Walsh, Glenshaw, Pa., assignors to Gulf Research & Development Company, Pittsburgh, Pa., a corporation of Delaware
No Drawing. Filed Dec. 18, 1967, Ser. No. 691,233
Int. Cl. C07c 43/20
U.S. Cl. 260—612          7 Claims

ABSTRACT OF THE DISCLOSURE

A process is defined for preparing a substituted phenyl ether thermally. The ether is prepared by reacting an activated chloride or bromide such as benzyl chloride with a 2,4,6-trisubstituted phenol under thermal conditions including a temperature of at least 150° C. For example, the reaction of 2,4,6-trimethylphenol with benzyl chloride yields 2,4,6-trimethylphenyl benzyl ether.

---

This invention relates to a process for the preparation of substituted phenyl ethers by the thermal reaction of certain activated halides with a 2,4,6-trisubstituted phenol.

The reaction of alkyl halides with alkali metal phenoxides to produce ethers has been known for some time as the Williamson synthesis. No one, however, has been able to this time to produce a phenyl ether by the direct thermal reaction of a phenol with an organic halide.

It has now been found that substituted phenols will thermally react with certain activated halides to yield a substituted phenyl ether. These phenyl ethers are useful as synthetic lubricants and heat transfer agents.

In accordance with the invention, a substituted phenyl ether is produced thermally by contacting an activated chloride or bromide with a 2,4,6-trisubstituted phenol at a temperature of at least 150° C. for a time sufficient for reaction to occur and thereafter recovering the substituted phenyl ether and either hydrogen chloride or hydrogen bromide.

The improved process of the subject file has the additional benefit that a hydrogen halide is produced as the byproduct rather than an alkali metal halide as in the Williamson synthesis. The dry hydrogen halide can be recovered as such or recycled and utilized in the production of additional amounts of the activated halide.

The activated halide can be any mono substituted chloroform or bromoform wherein the substituent is a nonreactive electron withdrawing group. Electron withdrawing groups are well known in the art and include, for example, a phenyl group; keto group

where R is any hydrocarbon radical having from one to ten carbon atoms); aldehyde group

nitro group (—NO$_2$); cyano group (—C≡N); and alkoxy group (—OR where R is as defined). Other well known electron withdrawing groups such as hydroxyl, carboxyl and ester groups are unsuitable as they interact with the phenolic hydroxyl group of the charge stock.

A general formula for the preferred activated halides is:

where X is chlorine or bromine and Y is a group selected from the class consisting of phenyl, keto

where R is any hydrocarbon radical having from one to ten carbon atoms); aldehyde

nitro (—NO$_2$); cyano (—C≡N); alkoxy (—OR where R is as defined); and substituted phenyl where the substituents are selected from the group consisting of hydrocarbon radicals having between one and ten carbon atoms; halogen; nitro (—NO$_2$); cyano (—C≡N); alkoxy (—OR where R is as defined); keto

where R is as defined); aldehyde

and the —SH group where R is as defined.

Examples of groups which are not electron withdrawing and are not suitable include hydrocarbon radicals such as n-octyl, cycloaliphatic, halogen, amines, etc.

A list of suitable activated halides which can be used in the process of this invention is given below. It is to be understood that this list is exemplary only and other halides coming within the purview of the above definition can also be employed. Mixtures of the halides can also be used if desired.

| | |
|---|---|
| Nitrochloromethane | Nitrobromomethane. |
| Cyanochloromethane | Cyanobromomethane. |
| Chloroacetaldehyde | Bromoacetaldehyde. |
| Chloroacetone | Bromoacetone. |
| α-Chloropentanone | α-Bromopentanone. |
| α-Chlorodecanone | α-Bromodecanone. |
| Chloromethylether | Bromoethylether. |
| α-Chlorobutylether | α-Bromobutylether. |
| α-Chlorooctylether | α-Bromooctylether. |
| Benzyl chloride | Benzyl bromide. |
| Nitrobenzyl chloride | Nitrobenzyl bromide. |
| Cyanobenzyl chloride | Cyanobenzyl bromide. |
| Acetobenzyl chloride | Acetobenzyl bromide. |
| α-Chloromethylphenyloctanone-4 | α-Bromomethylphenyloctanone-4. |
| Ortho-chlorobenzyl chloride | Ortho-bromobenzyl bromide. |
| Methoxybenzyl chloride | Methoxybenzyl bromide. |
| Butoxybenzyl chloride | Butoxybenzyl bromide. |
| α-Chloromethyl benzaldehyde | α-Bromomethyl benzaldehyde. |
| Meta-bromobenzyl chloride | Meta-bromobenzyl bromide. |
| Para-iodobenzyl chloride | Para-iodobenzyl bromide. |
| Ortho-fluorobenzyl chloride | Ortho-fluorobenzyl bromide. |
| Thioxybenzyl chloride | Thioxybenzyl bromide. |

The 2,4,6-trisubstituted phenol is any phenol having substituents in the ortho, ortho and para positions on the ring carbon atoms with respect to the phenolic OH group, providing, of ocurse, the substituents are not so bulky as to sterically hinder the entry of the activated halide to the phenolic OH and further provided the substituents do not react with the activated halide. The 2,4,6-trisubstituted phenol must, of course, have at least six carbon atoms and can have as many as 18. Preferably, the phenol has between 6 and 12 carbon atoms.

The preferred 2,4,6-trisubstituted phenols have the general formula:

where R$^1$, R$^2$, and R$^3$ can be the same or different and are selected from the group consisting of hydrocarbon radicals having between one and six carbon atoms; halogen atoms; alkoxy groups (—OR⁴ where R⁴ is any hydrocarbon radical having one to six carbon atoms); nitro groups (—NO₂); thioxy groups (—SR⁴ where R⁴ is as defined); aldehyde groups

cyano (—C≡N); keto groups

where R⁴ is as defined).

The meta positions of the phenol nucleus can also be substituted with the same groups as the ortho, para positions if desired.

The ortho, para positions of the phenol nucleus are substituted to prevent alkylation of the ring carbon atoms by the activated halides since the phenolic OH group is an ortho-para directing group. It has been found that no meta alkylated phenols are obtained in the product using the ortho, para-substituted phenols as defined above.

A list of suitable 2,4,6-trisubstituted phenols which can be used in the process of this invention is given below. It is to be understood that this list is exemplary only and other ortho, para-substituted phenols coming within the purview of the definition above can be employed. Mixtures of the phenols can also suitably be employed.

2,4,6-trimethylphenol (mesitol)
2,4-dimethyl-6-tertiary-butylphenol
2,6-dimethyl-4-tertiary-butylphenol
2,4,6-triisopropylphenol
2,4,6-tribromophenol
2,4,6-trichlorophenol
2,6-dimethyl-4-nitrophenol
2,6-dimethyl-4-cyanophenol
2,6-dimethoxy-4-methylphenol
2,6-aceto-4-methylphenol
1-hydroxy-2,6-dimethyl-4-benzaldehyde
2,6-dithiomethoxy-4-butylphenol

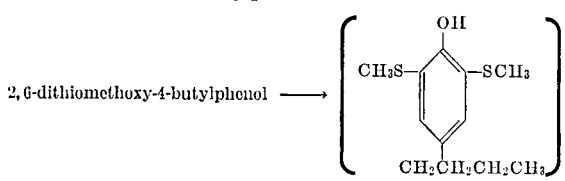

2-methyl-6-propyl-4-nitrophenol
2,6-dimethyl-4-hexylphenol

The phenolic and activated halide reactants are maintained in the liquid phase during reaction. The manner of mixing the reactants is not critical nor is the molar ratio of one reactant to the other. The reaction proceeds in accordance with the equation given below utilizing 2,4,6-trimethylphenol and benzyl chloride as illustrative reactants:

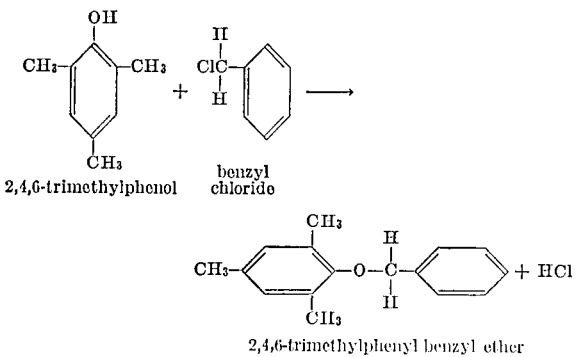

Stoichiometrically, one mole of each of the reactants is required to produce one mole of ether and one mole of HCl by-product. Actually, the substituted phenols are mostly low melting crystalline solids and while they will melt under reaction conditions, it is preferred to employ greater amounts of the halide reactant which is normally liquid to serve as a solvent. Suitable molar ratios of the halide to phenol can be between 1:10 and 10:1 with preferred ratios being between 3:1 and 1:3 and the most preferred is about 1:1.

If desired, a mutual inert solvent can be employed to dissolve the reactants or serve as a heat transfer medium. The use of inert solvents is particularly desirable in a continuous type of operation. The products can be removed from the reaction solvent by any suitable means such as by vacuum distillation. The inert solvent is preferably sufficiently high boiling to be liquid under reaction conditions although if desired a part or all of the solvent can be vaporized out of the reaction vessel as the reaction proceeds to aid in sweeping the HCl or HBr from the reaction zone. An inert gas such as nitrogen can also be employed if desired as a sweep gas. The HCl would, as noted, vaporize out with the solvent and means would be required to separately recover the solvent and HCl. For example, the solvent can be recovered by a simple condensation chamber with the HCl gas passing off overhead to a recovery unit such as a pressure chamber. The amount of solvent is not critical and can vary between 20 and 500 weight percent of the reaction mixture with preferred amounts of solvent between 50 and 200 weight percent. Suitable solvents include light and heavy mineral oils, hydrocarbons such as n-pentane, cyclohexane, hexadecane, trichlorobenzene and other chlorinated hydrocarbons such as carbon tetrachloride, etc. In short, any inert solvent.

As noted above, the reaction proceeds by thermal means. The reaction temperature can suitably be between 150° C. and 325° C. Temperatures below 150° C. are undesirable because the yield of product is too small to be of interest. Temperatures about 325° C. are undesirable because of the thermal breakdown in the reaction products and reactants. Preferred reaction temperatures are those between 180° and 250° C.

The reaction pressure is not critical and can be from subatmospheric to superatmospheric pressures of 1000 p.s.i.g. or higher. It is preferred that the pressure-temperature combination be such that the byproduct HCl be in the vapor phase so that it can be easily and quickly removed from the reaction zone to facilitate its recovery and to serve as a means of driving the chemical reaction in the desired direction of forming the ether. Atmospheric pressure is preferred from the standpoint of economics but increased pressures may be needed to maintain the reactants including a portion of the solvent in the liquid phase.

The reaction time is, as expected, a function of reaction temperature and the particular reactants employed. In general, reaction times are between two and four hours, but times as short as 0.5 hour can be employed with the more active charge stocks and times as long as two days or longer can be employed with the less reactive charge stocks.

The reaction can be run batch style with the reactants added singly or together or the reaction can be run in a continuous manner by continuously adding a mixture of the individual components to a heated reaction zone from which a gaseous HCl by-product is removed overhead and an ether product is continuously removed from the lower sections of the reaction zone.

The ether can be recovered from the reaction product in any suitable manner such as by a vacuum distillation of the product.

The invention will be further described with relation to the following experimental work.

EXAMPLE 1

The reaction of 2,4,6-trimethylphenol with benzyl chloride

Benzyl chloride (26.0 gm., 0.205 mole) was charged along with 2,4,6-trimethylphenol (9.0 gm., 0.066 mole) to a 75-milliliter Pyrex test tube equipped with a thermometer and an air condenser. The reaction mixture was heated for a period of five hours at a temperature of 187°–207° C. at atmospheric pressure. During this period HCl is evolved as a gas and was collected in a weak base ion exchange resin (Rexyn RG3 (OH)). HCl (0.95 gm., 0.026 mole) was collected. The organic product analysis was carried out using gas liquid chromatography which indicated a 46.6 mole percent yield of 2,4,6-trimethylphenylbenzyl ether.

The use of nitrobenzylchloride in place of benzyl chloride gives 2,4,6 - trimethylphenolnitro - benzylether. Likewise, dinitrobenzylchloride gives 2,4,6-trimethylphenyldinitrobenzylether.

EXAMPLE 2

The reaction of 2,6-di-tertiarybutyl-4-methylphenol with benzyl chloride

Benzyl chloride (29.0 gm., 0.229 mole) was charged along with 2,6-di-tertiarybutyl-4-methylphenol (5.0 gm., 0.023 mole) to a 75-milliliter Pyrex test tube equipped with a thermometer and an air condenser. The reaction mixture was heated for a period of twelve hours at a temperature of between 180° and 187° C. at atmospheric pressure. No evolution of HCl was detected. Gas liquid chromatography analysis of the organic reaction mixture did not indicate that any benzyl ether had formed.

A comparison of Examples 1 and 2 shows that the presence of two bulky groups in the ortho positions to the phenolic OH group prohibits the reaction between the activated halide and the phenolic OH group by steric hindrance.

EXAMPLE 3

The reaction of 2,4,6-triisopropylphenol with benzyl chloride

Benzyl chloride (26.0 gm., 0.206 mole) was charged along with 2,4,6-triisopropylphenol (14.7 gm., 0.066 mole) to a 75-milliliter Pyrex test tube equipped with a thermometer and air condenser. The reaction mixture was heated for a period of 14 hours at a temperature of 190°–192° C. at atmospheric pressure. During this period HCl was evolved as a gas and was collected in a weak base ion exchange resin (Rexyn RG3 (OH)). HCl (0.07 gm., 0.002 mole) was collected. The organic product analysis was carried out using gas liquid chromatography which indicated a 7.1 mole percent yield of the 2,4,6-triisopropylphenylbenzyl ether.

A comparison of Examples 2 and 3 shows that the two isopropyl groups in the ortho positions to the phenolic OH group do not offer as much steric hindrance as the two tertiary butyl groups in Example 2 and thus the reaction is allowed to proceed.

EXAMPLE 4

The reaction of 2,4-dimethyl-6-tertiary-butylphenol with benzyl chloride

Benzyl chloride (19.7 gm., 0.156 mole) was charged along with 2,4-dimethyl-6-tertiary-butylphenol (9.0 gm., 0.05 mole) to a 75-milliliter Pyrex test tube equipped with a thermometer and an air condenser. The reaction mixture was heated for a period of 12 hours at a temperature of 188°–189° C. at atmospheric pressure. During this period HCl is evolved as a gas and was collected in a weak base ion exchange resin (Rexyn RG3 (OH)). HCl (0.16 gm.) was collected. The organic product analysis was carried out using gas liquid chromatography which indicated a 7.8 mole percent yield of the 2,4-dimethyl-6-tertiary-butylphenylbenzyl ether.

A comparison of Examples 1, 2 and 4 shows that although two tertiary butyl groups in the ortho positions to the phenolic hydroxyl group (Example 2) prevented reaction from taking place, a reaction does occur when a tertiary butyl group is in one of the ortho positions so long as a small substituent such as a methyl group is in the other ortho position (Example 4).

EXAMPLE 5

The reaction of 2,4,6-trimethylphenol with benzyl bromide

Example 1 was repeated except 35 gms. of benzyl bromide was used in place of the benzyl chloride; the reaction temperature was 200°–205° C.; and the reaction time was only four hours. HBr (0.77 gm.) was collected. The yield of 2,4,6-trimethylphenylbenzylether was 14.3 percent.

A comparison of Examples 1 and 5 shows that both chlorides and bromides can be employed in the subject reaction.

All of the above examples show that 2,4,6-trisubstituted phenols do react thermally with an activated halide such as benzyl chloride to give a substituted phenyl ether where the substituents are the same as those appearing on the substituted phenol charge stock. The substituents on the phenol charge stock should be such that they do not result in sterically hindering the desired reaction. Thus, the presence of two tertiary butyl groups in the ortho position are too bulky for the reaction of the phenolic hydroxyl group with benzyl chloride.

Anyone with ordinary skill in the art with the above teachings before him can easily determine by a few simple experiments, such as with chemical models, whether any given 2,4,6-trisubstituted phenol will react with any given activated halide so long as the definitions of the phenol and halide fall within the purview of the definitions given above.

Resort may be had to such variations and modifications as fall within the spirit of the invention and the scope of the appended claims.

What is claimed is:

1. A process for the production of a substituted phenyl ether which comprises:

reacting an activated halide having the general formula:

where X is chlorine or bromine and Y is a group selected from the class consisting of phenyl and substituted phenyl where the substituents are selected from the group consisting of hydrocarbon radicals having between 1 and 10 carbon atoms; halogen; nitro ($NO_2$); and alkoxy (—OR where R is any hydrocarbon radical having from 1 to 10 carbon atoms)

with a 2,4,6-trisubstituted phenol wherein the substituents are hydrocarbon radicals having between 1 and 6 carbon atoms and wherein the substituents do not sterically hinder the entry of said activated halide to the phenolic OH under thermal conditions including a temperature between 150° C. and 325° C. in the absence of a catalyst and thereafter recovering said substituted phenyl ether and dry HCl or HBr gas.

2. A process according to claim 1 wherein the activated halide is benzyl chloride.

3. A process according to claim 1 wherein the phenol is 2,4,6-trimethylphenol.

4. A process according to claim 1 wherein the phenol is 2,4,6-triisopropylphenol.

5. A process according to claim 1 wherein the phenol is 2,4-dimethyl-6-tertiary-butylphenol.

6. A process according to claim 1 wherein the activated halide is benzyl bromide.

7. A process according to claim 6 wherein the phenol is 2,4,6-trimethylphenol.

References Cited

Huston et al.: JACS, vol. 55 (1933), pp. 2146–2149.
Huston et al.: JACS, vol. 55 (1933), pp. 4639–4643.
Behoghel et al.: Chem. Abs. vol. 28 (1934), pp. 6707–6708.

BERNARD HELFIN, Primary Examiner

U.S. Cl. X.R.

260—609, 613, 600, 590, 591, 592, 465

PO-1050
(5/69)

UNITED STATES PATENT OFFICE
CERTIFICATE OF CORRECTION

Patent No. 3,541,157                    Dated November 17, 1970

Inventor(s) Russell G. Hay, John G. McNulty and William L. Wals

It is certified that error appears in the above-identified patent and that said Letters Patent are hereby corrected as shown below:

Column 2, line 9, "(-C-H " with O double bond should be ---(-C-H)--- with O double bond.

Column 2, line 24, "-SH" should be --- -SR ---.

Column 2, line 54, "ocurse" should be ---course---.

Column 3, line 42, delete "2,6-dithiomethoxy-4-butylphe (It was printed twice).

Column 6, line 16, "plaec" should be ---place---.

Signed and sealed this 11th day of May 1971.

(SEAL)
Attest:

EDWARD M. FLETCHER, JR.           WILLIAM E. SCHUYLER, J
Attesting Officer                  Commissioner of Patents